US007555006B2

United States Patent
Wolfe et al.

(10) Patent No.: US 7,555,006 B2
(45) Date of Patent: Jun. 30, 2009

(54) METHOD AND SYSTEM FOR ADAPTIVE TRANSCODING AND TRANSRATING IN A VIDEO NETWORK

(75) Inventors: Andrew L. Wolfe, Los Gatos, CA (US); David Westerhoff, Fremont, CA (US)

(73) Assignee: The Directv Group, Inc., El Segundo, CA (US)

( * ) Notice: Subject to any disclaimer, the term of this patent is extended or adjusted under 35 U.S.C. 154(b) by 749 days.

(21) Appl. No.: 10/939,669

(22) Filed: Sep. 13, 2004

(65) Prior Publication Data

US 2005/0091696 A1 Apr. 28, 2005

Related U.S. Application Data

(60) Provisional application No. 60/503,151, filed on Sep. 15, 2003.

(51) Int. Cl.
*H04J 3/22* (2006.01)
(52) U.S. Cl. .............. 370/465; 370/268; 370/477; 375/240.01; 375/240.02; 375/240.07; 725/116
(58) Field of Classification Search .............. 370/465, 370/468, 477; 375/240.01, 240.02, 240.07; 707/104; 725/116
See application file for complete search history.

(56) References Cited

U.S. PATENT DOCUMENTS

| 5,956,729 | A | | 9/1999 | Goetz et al. ............ 707/104 |
|---|---|---|---|---|
| 5,959,677 | A | * | 9/1999 | Date et al. ............ 375/240.01 |
| 6,037,991 | A | * | 3/2000 | Thro et al. ................ 725/116 |
| 6,091,777 | A | | 7/2000 | Guetz et al. ............... 375/240 |
| 6,104,705 | A | | 8/2000 | Ismail et al. ............... 370/260 |
| 6,141,693 | A | * | 10/2000 | Perlman et al. ............ 709/236 |
| 6,463,445 | B1 | | 10/2002 | Suzuki et al. ............. 707/200 |
| 6,502,139 | B1 | * | 12/2002 | Birk et al. ................. 709/233 |
| 6,622,305 | B1 | * | 9/2003 | Willard ..................... 725/101 |
| 6,625,667 | B1 | * | 9/2003 | Westerman ................. 710/5 |
| 6,747,991 | B1 | * | 6/2004 | Hemy et al. ............... 370/468 |
| 7,296,295 | B2 | * | 11/2007 | Kellerman et al. ......... 726/26 |

(Continued)

OTHER PUBLICATIONS

International Search Report for PCT/US04/29940 mailed Mar. 18, 2005.

*Primary Examiner*—Ricky Ngo
*Assistant Examiner*—Luat Phung
(74) *Attorney, Agent, or Firm*—McDonnell Boehnen Hulbert & Berghoff LLP

(57) ABSTRACT

A video server adaptively selects an appropriate video encoding standard and an appropriate video encoding rate for encoding video content to be downloaded to one or more video client devices over a communication network. The video server adaptively selects the video encoding standard and the video encoding rate based upon factors such as the data transmission rate of the communication network, the processing speed of the video client device, or the type of the video content to be downloaded. Once the video encoding standard and the video encoding rate are selected, video content can be transcoded prior to downloading to one or more video client devices. During the download, the video content may be adaptively transrated, such as in response to a change in the data transmission rate of the communication network.

39 Claims, 8 Drawing Sheets

U.S. PATENT DOCUMENTS

| | | | |
|---|---|---|---|
| 2002/0037716 A1* | 3/2002 | McKenna et al. | 455/422 |
| 2003/0084461 A1* | 5/2003 | Hoang | 725/145 |
| 2003/0095561 A1* | 5/2003 | Hwang | 370/432 |
| 2003/0169818 A1* | 9/2003 | Obrador | 375/240.21 |
| 2003/0206658 A1* | 11/2003 | Mauro et al. | 382/239 |
| 2003/0222973 A1* | 12/2003 | Hiroi et al. | 348/14.01 |
| 2004/0014482 A1* | 1/2004 | Kwak et al. | 455/522 |
| 2004/0194142 A1* | 9/2004 | Jiang et al. | 725/96 |
| 2004/0233844 A1* | 11/2004 | Yu et al. | 370/230 |
| 2005/0021830 A1* | 1/2005 | Urzaiz et al. | 709/234 |
| 2005/0117641 A1* | 6/2005 | Xu et al. | 375/240.08 |
| 2006/0140270 A1* | 6/2006 | Li et al. | 375/240.12 |

* cited by examiner

METHOD AND SYSTEM FOR ADAPTIVE TRANSCODING AND TRANSRATING IN A VIDEO NETWORK

RELATED APPLICATION

This application claims the benefit of U.S. Provisional Application No. 60/503,151, filed on Sep. 15, 2003, which is incorporated by reference herein.

FIELD OF THE INVENTION

The present invention relates generally to video networks. More specifically, it relates to altering encoding formats and encoding rates of video content transmitted in a video network.

BACKGROUND OF THE INVENTION

Digital entertainment systems such as digital video recorders (DVRs), personal video recorders (PVRs), and digital video disc (DVD) players have received increased attention lately and have become popular. These digital entertainment systems are capable of reproducing video and/or audio content at a higher quality compared to conventional analog entertainment systems because the video and audio content are stored in digital format. The digital format of video content also facilitates implementation of program guides and manipulation of the video content by users.

Conventional DVRs typically receive video content either from a conventional video cable or through broadband connection, and encode and store the received video content in compressed digital formats such as MPEG-2 for future retrieval by a user. In this manner, users are able to view high quality video content at any desired time without deterioration of image quality as compared with analog recording of video content. One example of a conventional DVR is the ReplayTV® brand of DVRs.

Communications networks have a certain transmission rate in a given frequency band. For example, the IEEE 802.11a standard provides up to 54 Mbps transmission in the 5 GHz band. The IEEE 802.11b standard (also referred to as 802.11 High Rate or Wi-Fi) provides 11 Mbps transmission (with a fallback to 5.5 Mbps, 2 Mbps and 1 Mbps) in the 2.4 GHz band. The IEEE 802.11 g standard provides 20+Mbps in the 2.4 GHz band. The Bluetooth standard provides up to 720 Kbps data transfer in the 2.4 GHz band. As such, different video client devices in a video network may use different communications standards. Furthermore, the data transmission rate of the communication network between a video server and the video client devices may be affected by external conditions such as noise and the like. As such, these various communication networks can only handle video encoding standards and video encoding rates using a transmission rate lower than that of the video client device.

Furthermore, digital video encoding standards require a certain amount of bandwidth. For example, MPEG-1 uses a bandwidth ranging from 500 Kbps to 4 Mbps, averaging about 1.25 Mbps. MPEG-2 uses a bandwidth ranging from 4 to 16 Mbps. Bandwidths are typically dependent on source quality in addition to encoding technology. For example, MPEG-2 is generally more efficient than MPEG-1, but the official standards define their respective bit rates. That is, if desired, MPEG-1 could be run at a much higher bit rate than 4 Mb/sec. For the same bit rates, different encoding formats may have different source qualities. For example, at the same bit rate, MPEG-2 will generally have a higher source quality than MPEG-1.

In addition, video client devices may have limited processing speed depending upon the type of processors and memories they use. As such, the video client devices may be able to handle only certain types of video encoding standards and video encoding rates requiring a processing speed that is lower than the maximum processing speed supported by the video client devices. Also, the video client devices might also be limited by the particular codes that they support. For example, a video client device that does not include an MPEG-1 codec might not be able to playback MPEG-1 video content no matter how much processing speed the video client device supports.

Furthermore, certain types of video content may require higher a transmission rate in communications between the video server and the video client devices than other types of video content. For example, animation video contents would require higher data transmission rates for downloading because it requires a relatively high encoding rate in order to deliver good quality images. On the other hand, a concert recording would not require such high data transmission rates, because it does not require high encoding rates to deliver acceptable quality images of a concert scene.

Therefore, there exists a need for an improved method of transmitting video content between a video server and a video client device.

SUMMARY OF INVENTION

The present invention provides adaptive transcoding and transrating capabilities in a video network when downloading video content to client video devices over a communication network, such as by adaptively selecting an appropriate video encoding standard and/or video encoding rate based upon factors such as the transmission rate of the communication network, the processing speed of the video client device(s) and the video content. The video content can then be transcoded to the selected encoding standard and/or encoding rate prior to downloading to a video device. When one or more of these factors are changed, then the video encoding standard and/or the video encoding rate may be adaptively changed. For example, during a download to a video device, the downloaded content might be transrated in order to account for network congestion or other factors altering the transmission rate of the communication network.

In one embodiment, a video server monitors the transmission rate of a communication link between the video server and the video client device and adaptively selects an appropriate video encoding standard and/or video encoding rate based upon the transmission rate of the communication network and based on the codecs supported by the video client device. In another embodiment, the video server monitors the bandwidth of a video network including a video server and a plurality of video client devices, adaptively allocates parts of the bandwidth to each of the video client devices, and encodes video content using encoding standards and/or encoding rates based upon the allocated bandwidth for downloading to the video client devices and based on the codecs supported by the video client devices.

In still another embodiment, the video server determines the rate at which the video client device can receive data and selects an appropriate video encoding standard and/or video encoding rate based upon the transmission rate for downloading to the video client device. The video server can also determine the video content to be downloaded to a video client device and an acceptable error rate for the video content and selects an appropriate video encoding standard and/or video encoding rate based upon the video content.

Because the video server may adaptively select an appropriate video encoding standard and/or video encoding rate for downloading video content to video client device(s) based upon factors such as the data transmission rate of the communication link, the processing speed of the video client device(s), or the video content, the video server may download video content to the video client device(s) over the video network in manner that takes advantage of the available resources while still using a supported encoding standard and encoding rate.

BRIEF DESCRIPTION OF THE DRAWINGS

The teachings of the present invention can be readily understood by considering the following detailed description in conjunction with the accompanying drawings.

DETAILED DESCRIPTION OF PREFERRED EMBODIMENTS

The preferred embodiments of the present invention will be described below with reference to the accompanying drawings.

Figure 1:
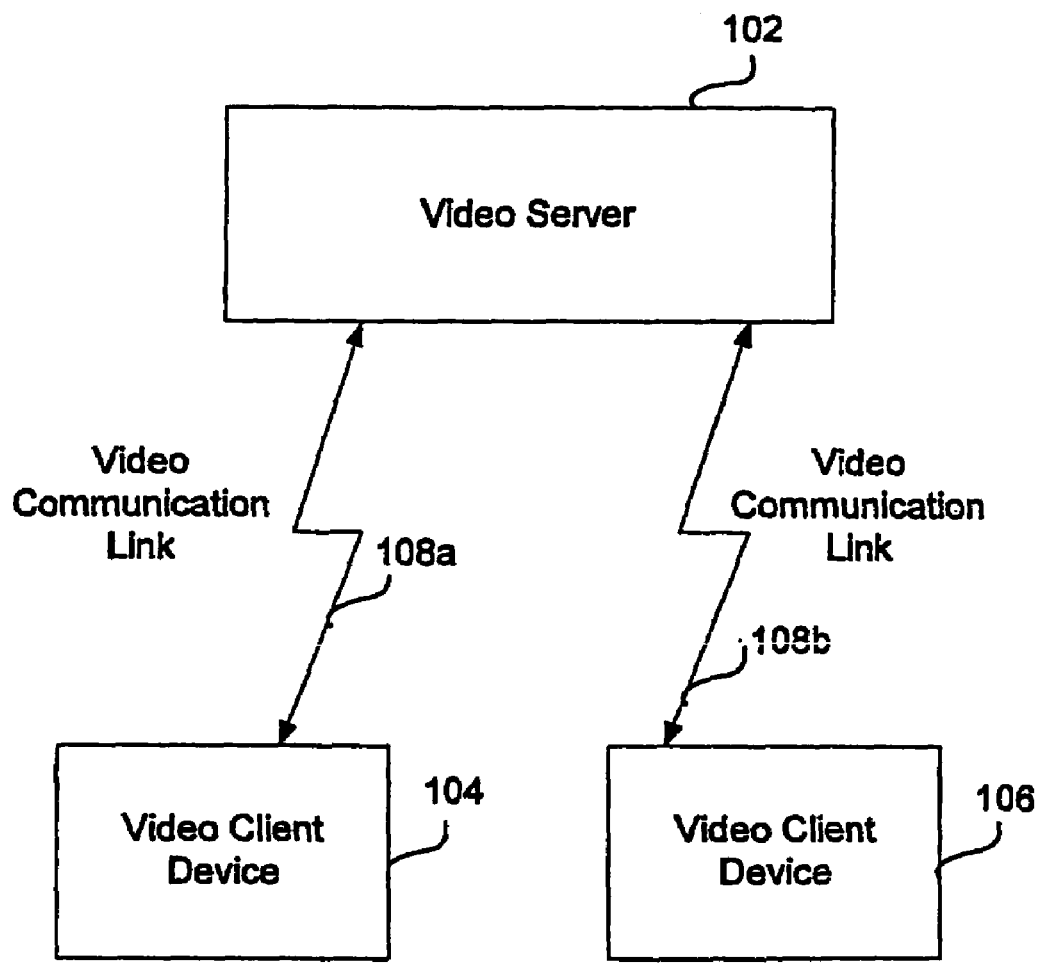
FIG. 1 is a block diagram illustrating a video network including a video server and video client devices according to an embodiment of the present invention.

FIG. 1 is a block diagram illustrating a video network 100 according to an embodiment of the present invention. The video network 100 includes a video server 102 and one or more video client devices 104a, 104n. Although FIG. 1 is shown to have two video client devices 104a, 104n, the video network 100 can have any number of video client devices.

Referring to FIG. 1, the video server 102 stores video content in a digital format, such as MPEG-1, MPEG-2, MPEG-4, DivX, Windows Media Audio ("WMA") or others. The video server 102 can transmit the video content to the video client devices 104a, 104n via respective video communication links 108a, 108n. Before transmitting the video content to the video client devices 104a, 104n, the video server 102 might first transcode the video content into a different encoding standard and/or video encoding rate. The video server 102 may then transmit the transcoded video content to the video client devices 104a, 104n via the respective video communication links 108a, 108n. As illustrated in FIG. 1, wireless communication links 108a, 108n are preferably used between the video server 102 and the video client devices 104a, 104n However, it should be noted that wired communication links might also be used.

The transmission rate of the video communication link 108a between the video server 102 and the video client device 104a may be different from the transmission rate of the video communication link 108n between the video server 102 and the other client device 104n. Thus, the video server 102 may separately monitor and determine the respective transmission rates of the communication links 108a, 108n between the video server 102 and the video client devices 104a, 104n. Then, the video server 102 might adaptively select an appropriate video encoding standard and/or an appropriate video encoding rate based upon the transmission rate of the communication links 108a, 108n and based on the codecs supported by the video client devices 104a, 104n. This can allow the video content to be downloaded to the video client devices 104a, 104n in a manner that takes advantage of the transmission rates supported by the communication links 108a, 108n so as to maximize the image quality of the video content.

The video server 102 can be any type of digital device that can store video content in digital format and transcode video content according to a plurality of video encoding standards and/or video encoding rates. The video server 102 also preferably has wireless communication capabilities for downloading video content to video client devices 104a, 104n although the video server 102 can also have wired communication capabilities instead of wireless communication capabilities. For example, the video server 102 might be a digital video recorder, such as the ReplayTV® brand of digital video recorders, with wireless communication capabilities and other functionality of the present invention added to it.

The video client devices 104a, 104n can also be any type of digital device that can receive video content in digital format over a communication network. The video content is downloaded from the video server 102 to the video client devices 104a, 104n according to various video encoding standards and/or video encoding rates. The video client devices 104a, 104n preferably have wireless communication capabilities for receiving video content in digital format from the video server 102, although the video client devices 104a, 104n might also have wired communication capabilities. Examples of the video client devices 104a, 104n are digital video recorders with wireless communication capabilities and decoding capabilities added to them.

The video client devices 104a, 104n might optionally include storage (e.g., hard disks or other such memory) for storing the received content. The storage can allow the video client devices 104a, 104n to store the received content for later playback; however, a video client device with storage would not necessarily have to store downloaded video content. Video client devices without storage might only be able to playback video content in real-time or near real-time as it is downloaded to the devices but not otherwise store the video content for future playback. Even video client devices without sufficient storage for storing large amounts of downloaded video content might still include a small amount of memory for buffering the downloaded video content prior to playing it back on the video client device.

Figure 2:
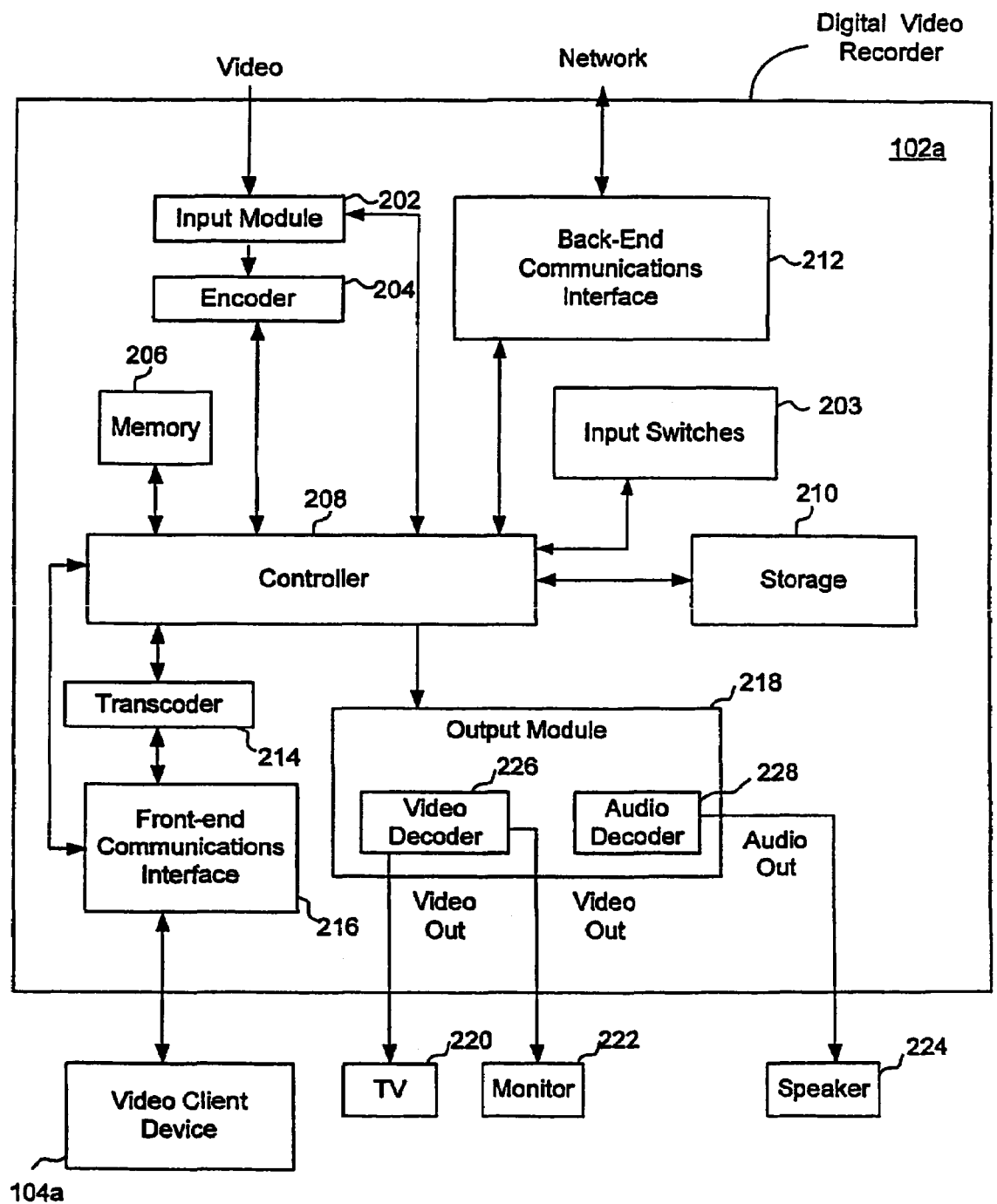
FIG. 2 is a block diagram illustrating a digital video recorder according to an embodiment of the present invention for use in a video network.

FIG. 2 is a block diagram illustrating a digital video recorder 102a as an example of a video server 102 according to one embodiment of the present invention. Referring to FIG. 2, the digital video recorder 102a includes an input module 202, input switches 203, an encoder 204, a memory 206, a controller 208, a data storage unit 210, a back-end communications interface 212, a transcoder 214, a front-end communications interface 216, and an output module 218. The digital video recorder 102a is coupled to a TV 220, a monitor 222, a speaker 224, and a video client device 104a. While the digital video recorder 102a is shown coupled to multiple output devices, the digital video recorder 102a need only be coupled to a single output device.

The input module 202 may receive input video content through various conventional interfaces, including coaxial RF antennas, an S-Video interface, and others. The received video signals may originate from a standard NTSC broadcast, high definition television (HDTV) broadcast, standard cable, satellite, home video (e.g., VHS) or other sources. The input module 202 may also receive input from other devices, such as set top box that receives one signal format and outputs an NTSC signal or other conventional video format. The input module 202 is configured to include appropriate tuning functionality.

The video content received by the input module 202 is passed on to the encoder 204. The encoder 204 converts video signals from a first format (e.g., analog NTSC, VHS, S-Video, or other conventional format) to a digital format, such as an MPEG format. Other digital formats may alternatively be used. The digital video data is then stored in the storage unit 210 for future retrieval under control of the controller 208.

The storage unit 210 may be any type of rewritable memory capable of storing digital data, such as a hard disk, an optical disk (e.g., a rewritable DVD (DVD-RW), rewritable CD (CD-RW), etc . . . ), flash memory, network storage or the like. Although various capacities of the storage unit 210 may be provided ranging from a few minutes to hundreds of hours, the storage unit 210 preferably stores at least one hour of video content in digital format. Currently, roughly about 1 hour of video content is stored using standard image quality for each gigabyte of storage. Video content stored in the storage unit 210 may be viewed immediately or at a later time. Additional information such as program guide data, title of the video content, and the like may be stored in the storage unit 210 in association with the stored video content to identify and manage the stored video content.

The digital video recorder 102a may also be connected to a data communication network, such as the Internet, via the back-end communications interface 212. The back-end communications interface 212 is a standard network interface that allows connection to an Ethernet-based network. This back-end communications interface 212 may also be used to connect to a home network or to a broadband Internet network. The digital video recorder 102a may download video content in digital format through the back-end communication interface 212 from various video content sources on the Internet. Because the video content received through the back-end communication interface 212 is generally already in digital format, the controller 208 might store the content in the storage medium 210 without processing by the encoder 204.

In addition, the digital video recorder 102a can transmit data to a remote server (not shown) on the data communication network through the back-end communications interface 212. For example, pay-per-view content selection information, request of specific entertainment content, credit card payment information, or any other type of information used by the digital video recorder 102a can be transmitted via the back-end communication interface 212 to the remote server.

The controller 208 controls the operation of the various components in the digital video recorder 102a, including the input module 202, the encoder 204, the memory 206, the back-end communications interface 212, the storage unit 210, the transcoder 214, the front-end communications interface 216, and the output module 218. To this end, the controller 208 executes instructions or programs stored in the memory 206 to provide various functionalities of the digital video recorder 102a, such as monitoring and determining the data transmission rate of the communication network between the digital video recorder 102a and the video client device 250 and selecting an appropriate video encoding standard and/or video encoding rate based upon the data transmission rate of the communication network. The memory 206 operates as a working memory for the controller 208 when the controller executes instructions and programs and may store additional instructions such as boot-up sequences or other information. The memory 206 is preferably a rewritable memory such as an SRAM or DRAM. Read-only memory, such as ROM, or other types of memory might also be used.

The output module 218 includes a video decoder 226 and an audio decoder 228. The video decoder 226 and the audio decoder 228 are commonly MPEG decoders that convert the digital video and digital audio content stored in the storage medium 210 into a format compatible with conventional display device, such as an NTSC format television set 220 or a computer monitor 222, and with conventional speakers 224. Other types of encoders and decoders, such as DivX, WMA or others, might alternatively be used.

The digital video recorder 102a downloads video content stored in the storage unit 210 to the video client device 104a via the front-end communications interface 216. The front-end communications interface 216 is preferably a wireless communication interface, such as a cellular modem, a Bluetooth interface, satellite communication interface, RF communication interface, or the like. Alternatively, a wired communication interfaces might be used. Any wireless communication standard can be used with the front-end communications interface 216, including the various IEEE 802.11 standards, Bluetooth and others. Also, the available bandwidth on such wireless communication networks varies widely depending upon the condition of the wireless communication networks. Alternatively, the video content can be downloaded to the video client device 104a with wired communication capabilities. In such case, the front-end communications interface 216 is a wired communication interface such as a standard modem that can be connected to a regular telephone line, an RS-232C interface, a standard USB port, an IEEE 1394 connection (otherwise known as FireWire, i.Link, or Lynx) or the like.

In one embodiment, the controller 208 controls the front-end communications interface 216 to monitor and determine the data transmission rate of the communication link between the digital video recorder 102a and the video client device 104a. The digital video recorder 102a can also communicate with the video client devices 104a, 104n to determine the particular codecs supported by the video client devices 104a, 104n. In making subsequent determinations of the video encoding standards and/or video encoding rates to use when downloading video content to the video client devices 104a, 104n, the digital video recorder 102a can also take into account the codecs supported by the video client devices 104a, 104n. This can help ensure that a video client device 104a, 104n receives the video content in a format that can be played back on the video client device 104a, 104n.

Once the data transmission rate of the communication network is determined, the controller 208 selects a video encoding standard and video encoding rate appropriate for the transmission rate of the communication channel. For example, if the communication network supports a maximum data rate of 2 Mbps, then an MPEG-2 encoding standard would not be appropriate for use with the communication network since MPEG-2 requires a 4-16 Mbps transmission rate. In such case, the controller 208 might select the best encoding standard compatible with 2 Mbps transmission, such as MPEG-1 which typically requires 1.25 Mbps. On the other hand, if the communication network uses IEEE 802.11a (e.g., 54 Mbps), then the controller 208 might select the best encoding standard and the best encoding rate compatible with 54 Mbps transmission, such as MPEG-2 with a 16 Mbps transmission rate. As another example, if the communication network uses IEEE 802.11b (e.g., 11 Mbps), then the controller 208 might select the best encoding standard and the best encoding rate compatible with a 11 Mbps transmission rate, such as MPEG-2 using an 11 Mbps transmission rate. It should be noted that the particular video encoding standards and the encoding rates given above are mere examples. Thus, the controller 208 can select a higher or lower quality video encoding standard and/or video encoding rate as long as the video encoding standard and the video encoding rate are compatible with the determined data transmission rate of the communication network.

In another embodiment, the controller 208 allocates bandwidth among a plurality of video client devices 104*a*. Although FIG. 2 shows one video client device 104*a*, the front-end communications interface 216 of the digital video recorder 102*a* is capable of communicating with a plurality of video client devices 104*a*-104*n* according to different communication standards under control of the controller 208. In such case, the digital video recorder 102*a* allocates part of the bandwidth to each of the video client devices 104*a*-104*n*. For example, if the digital video recorder 102*a* communicates with two video client devices 104*a*, 104*n* using IEEE 802.11b (e.g., 11 Mbps), the controller 208 might allocate half the bandwidth (e.g., 5.5 Mbps) to each of the two client video devices 104 and select a video encoding standard and/or video encoding rate compatible with the allocated bandwidth. As such, the controller 208 might select MPEG-1 with the highest encoding rate (e.g., 4 Mbps) or MPEG-2 with an encoding rate lower than 5.5 Mbps, thereby allowing simultaneous communication with both client video devices. The selected video encoding standards and/or video encoding rates might also be dependent on the client's capacity, buffer size, processing speed, etc. Alternatively, the controller 208 might use unequal bandwidth allocations, which might cause different video encoding standards and/or video encoding rates to be used between the devices.

In still another embodiment, the controller 208 detects the processing speed of a plurality of video client devices 104*a*-104*n* to which video content is downloaded and selects a video encoding standard and/or video encoding rate compatible with the processing speed of the video client devices 104*a*-104*n*. In still another embodiment, the video client devices 104*a*-104*n* might report their processing speeds to the digital video recorder 102*a*. If the video client device 104*a*-104*n* does not have the processing speed to decode video content encoded at encoding rates higher than 2 Mbps, the controller 208 selects a video encoding standard and an encoding rate that the video client devices 104*a*-104*n* can handle. On the other hand, if the client device 250 has the processing speed to decode video content encoded at encoding rates of up to 16 Mbps, the controller 208 may select MPEG-2 that typically encodes video content at rates of 4-16 Mbps.

In still another embodiment, the controller 208 selects the video encoding standard and the video encoding rate based upon the video content to be downloaded. For example, if the digital video recorder 102*a* needs to download video content that requires high-quality images such as animation, the controller 208 selects a video encoding standard and video encoding rate that delivers higher quality images. On the other hand, if the digital recorder 102*a* downloads video content that does not require high-quality images, such as recordings of concerts, the controller 208 selects a lower quality video encoding standard and video encoding rate that can deliver acceptable quality images. In this manner, the digital video recorder 102*a* can save bandwidth when dealing with a plurality of video client devices 104*a*-104*n*.

Once the controller 208 selects the video encoding standard and the video encoding rate based upon one or more of the factors described above, the transcoder 214 transcodes the video content stored in the storage unit 210 under control of the controller 208 according to the selected video encoding standard and selected video encoding rate. That is, the controller 208 may convert the video content from one compressed digital format to another compressed digital format. In transcoding the video content, the controller 208 may first decode the video content and then re-encode the video content to the new standard and/or encoding rate. For example, the controller 208 might decode the video content from a compressed form to an uncompressed form and then re-encode the video content into a different compressed form. Alternatively, the controller 208 might convert the video content from one digital format to another digital format without requiring a decoding phase. The transcoded video content may then be downloaded to the video client devices 104*a*-104*n* via the front-end communications interface 216.

Once the digital video recorder 102*a* determines a video encoding standard and video encoding rate, it can start downloading the video content to the video client devices 104*a*, 104*n*. During the download, however, various factors that influenced the original selection of the video encoding standard and/or video encoding rate may change. For example, network congestion might cause the data transmission rate of the communication network to decrease. Alternatively, the communication network might become less congested and therefore its data transmission rate might increase. Alternatively, the video client devices 104*a*, 104*n* might report different processing speeds back to the digital video recorder 102*a*. Other factors might change as well.

The digital video recorder 102*a* can monitor for these various changes and use them as a basis for further varying the video encoding standard and/or video encoding rate. For example, in response to detecting that the data transmission rate of the communication network has increased or decreased, the digital video recorder 102*a* may transrate the video content being downloaded to the video client devices 104*a*, 104*n*. Transrating generally involves changing the video content so as to alter the underlying encoding rate (e.g., either increasing or decreasing the encoding rate) of the video content. This would generally also alter the data transmission rate at which the video content needs to be downloaded to the video client devices 104*a*, 104*n* in order to support real-time playback of the video content. For example, video content that is transrated to a lower encoding rate could then be downloaded at a lower data transmission rate while still allowing the video client device 104*a*, 104*n* to still support real-time playback of the video content. It is possible that the transrated video content still might not be downloaded to the video client devices 104*a*, 104*n* at a fast enough rate to support real-time playback, however, transrating the video content to reduce its underlying encoding rate might still decrease the overall delays in downloading and playing back the video content that would otherwise occur of the video content were not transrated. Thus, transrating involves more than simply increasing or decreasing the rate at which the video is downloaded to the video client devices 104*a*, 104*n*.

Figure 3A:
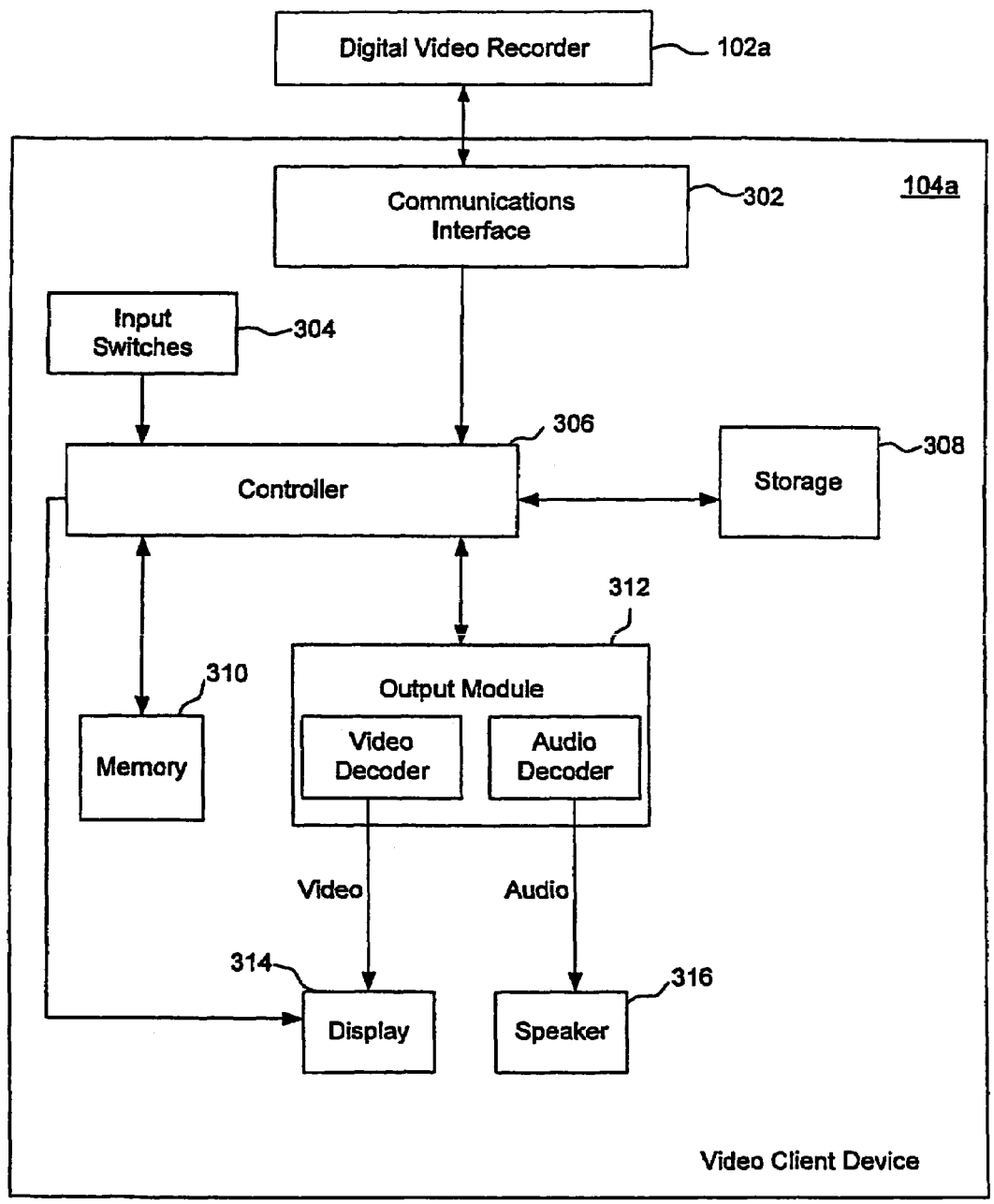
FIG. 3A is a block diagram illustrating a video client device according to an embodiment of the present invention for use in a video network.

FIG. 3A is a block diagram illustrating a video client device 104*a* according to an embodiment of the present invention for use in a video network. The video client device 104a is essentially a simplified digital video recorder, without encoding capabilities but with communications capabilities for communication with a video server such as a digital video recorder 102a.

Referring to FIG. 3A, the video client device 104a may operate in conjunction with the digital video recorder 102a as illustrated in FIG. 2. The video client device 104a includes a communications interface 302, input switches 304, a controller 306, a storage unit 308, a memory 310, an output module 312, a display 314, and a speaker 316.

According to one embodiment of the present invention, the digital video recorder 102a downloads video content to the video client device 104a via the communications interface 302 by wireless communication. The communications interface 302 is preferably a wireless communication interface such as a cellular modem, a Bluetooth interface, satellite communication interface or RF communication interface. The video encoding standard and the video encoding rate for the video content downloaded via the communications interface 302 are selected by the digital video recorder 102a as explained above, based upon the data transmission rate of the communication network between the digital video recorder 102a and the video client device 104a, the type of video content to be downloaded, the processing power of the video client device 104a, or any combination of these or other factors.

The downloaded video and audio content is in digital form and the controller 306 stores it in the storage unit 308 for immediate or future retrieval. The storage unit 308 may be any type of rewritable memory capable of storing digital data, such as flash memory, a hard disk, an optical disk (e.g., a rewritable DVD (DVD-RW), rewritable CD (CD-RW), etc . . . ) or any other rewritable data storage. The storage unit 308 may have any storage capacity, such as ranging from a few minutes to hundreds of hours. Additional information such as program guide data, title of the video content, and the like may be stored in the storage unit 308 in association with the stored video content to manage and identify the stored video content.

The input switches 304 provide means to the user to control the video client device 104a. The input switches 304 might include, but are not limited to, a play button, a stop button, a menu button, an enter/select button, a forward button, a rewind button, a power on/off button, a standby mode button, and the like. The input commands generated by the input switches 304 are provided to the controller 306 for control of the operation of the video client device 104a in response to the input commands.

The controller 306 receives the various input commands from the input switches 304 and also executes instructions or programs stored in the memory 310 to control the various elements in the video client device 104a, including the communications interface 302, the input switches 304, the storage unit 308, the memory 310, the output module 312, the display 314, and the speaker 316. The memory 310 operates as a working memory for the controller 306 when the controller 306 executes instructions and programs and may also store additional instructions such as boot-up sequences or other information. The memory 310 is preferably a rewritable memory but might alternatively be write-once memory or other types of memory.

The output module 312 includes a video decoder 318 and an audio decoder 320. The video decoder 318 and the audio decoder 320 convert the digital video and digital audio content stored in the storage unit 308 into a format compatible with a conventional display device 314 and with a conventional speaker 316, respectively. The video decoder 318 and the audio decoder 320 are preferably configured such that they are capable of decoding video content encoded according to any video encoding standard and any video encoding rate. The display device 314 can be a liquid crystal display (LCD) or a cathode ray tube (CRT). Other types of displays might alternatively be used.

The video client device 104a may be a portable device that operates as a client device to the digital video recorder 102a. The video client device 104a downloads video content from the digital video recorder 102a and stores it in the storage module 308 for immediate or figure retrieval. The video encoding standard and the video encoding rate according to which the downloaded video content is encoded are set by the digital video recorder 102a based upon various factors as described above, including the data transmission rate of the communication network between the digital video recorder 102a and the video client device 104a, the processing speed of the video client device 104a, and the type of video content to be downloaded. Therefore, the digital video recorder 102a might download video content to the video client device 104a in a way that is optimized for the capabilities of the network and the video client device 104a.

Figure 3B:
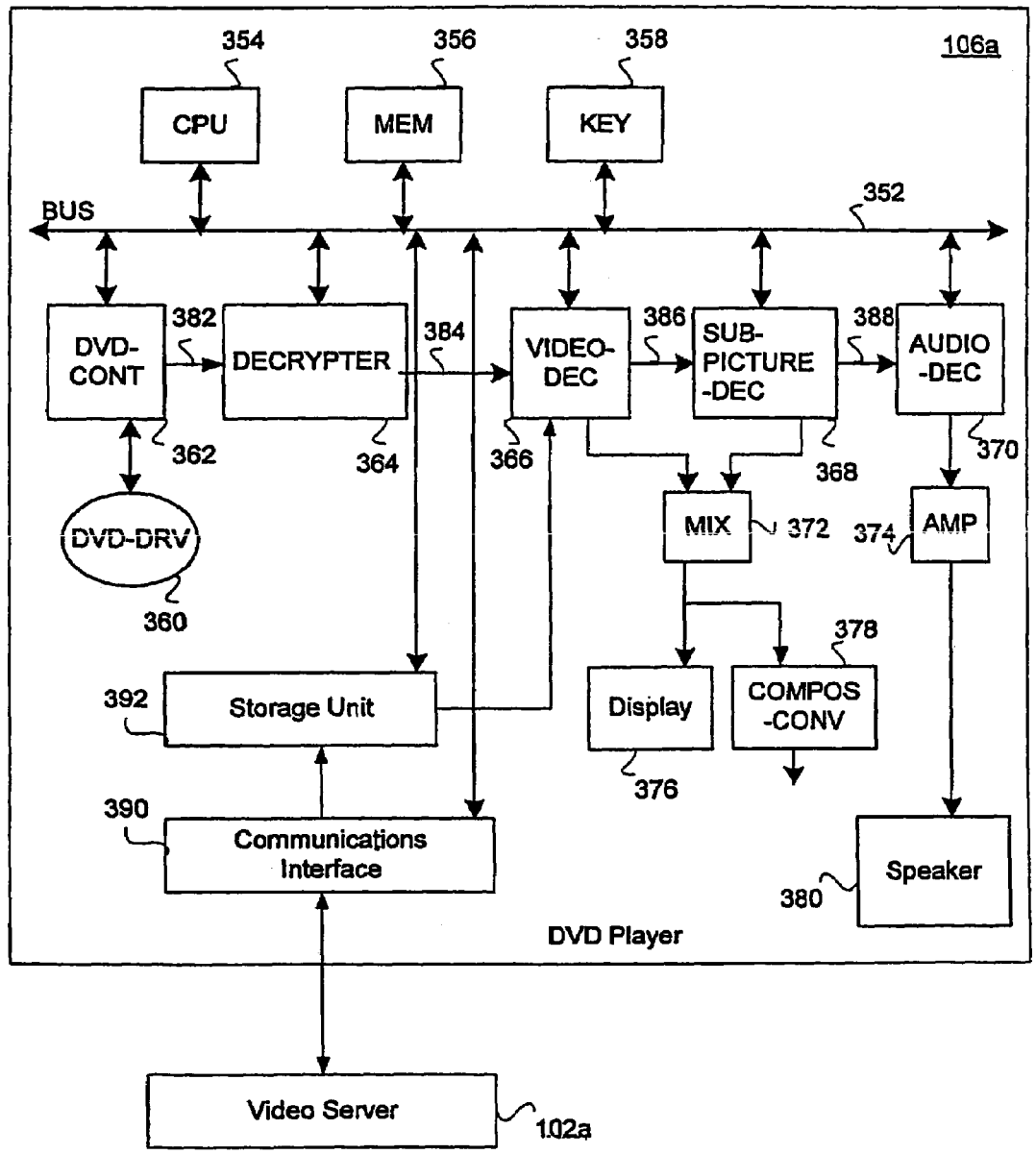
FIG. 3B is a block diagram illustrating a video client device according to another embodiment of the present invention for use in a video network.

FIG. 3B is a block diagram illustrating a DVD player 104n as the video client device according to another embodiment of the present invention for use in a video network. In this embodiment, the DVD player 104n may be a conventional DVD player.

Referring to FIG. 3B, the DVD player 104n might include an internal system bus 352, a processor (CPU) 354, an internal memory (MEM) 356, a keypad (KEY) 358, a DVD driving mechanism (DVD-DRV) 360, a DVD controller (DVD-CONT) 362, a video decoder (Video-DEC) 366, a sub-picture decoder (Sub-Picture-DEC) 368, an audio decoder (Audio-DEC) 370, a video mixer (MIX) 372, an audio amplifier (AMP) 374, a decrypter 364, a display 376, a speaker 380, a composite converter (COMPOS-CONV) 378, a communications interface 390, and a storage unit 392. All the components except the communications interface 390 and the storage unit 392 are typical components of a conventional DVD player and operate in a conventional manner. The processor 354 is modified from its conventional DVD player function to control the communications interface 390 and the storage unit 392 so that the DVD player 104n can operate as a client device to the video server 102a. The video server 102a can be, for example, the video server of FIG. 2.

The processor (CPU) 354 may control all the components in the DVD player 104n via the internal system bus 352. The internal memory (MEM) 356 is a working memory for the processor 354 and stores a variety of programs such as a system control program executed by the processor 354 and stores a variety of programs such as a system control program executed by the processor 354. The keypad (KEY) 358 is provided with various keys for controlling the DVD player 104n, including on/off keys, play, stop, forward, rewind, menu, enter/select, and the like.

The DVD drive mechanism (DVD-DRV) 360 drives the DVD and picks up the video data from the DVD. The DVD controller (DVD-CONT) 362 controls the DVD drive mechanism (DVD-DRV) 360 under control of the processor (CPU) 354. The DVD controller (DVD-CONT) sends the DVD data read out of the DVD drive mechanism (DVD-DRV) 360 to the video decoder (Video-DEC) 366, the sub-picture decoder (SUB-PICTURE-DEC) 368, and the audio decoder (AUDIO-DEC) 370 via the DVD data dedicated signal paths 382, 384, 386, and 388. In addition, the decrypter 364 is provided on the DVD data dedicated signal path 382 to decrypt the data read out of the DVD in case they are encrypted.

The video decoder (Video-DEC) 366 extracts and decodes video data from the DVD data received from the DVD controller (DVD-CONT) 362 via the DVD data dedicated signal path 384, and outputs decoded video data. The sub-picture decoder (SUB-PICTURE-DEC) 368 extracts and decodes sub-picture data from the DVD data received from the DVD controller (DVD-CONT) 362 via the DVD data dedicated signal path 386, and outputs still picture data. The audio decoder (AUDIO-DEC) 370 decodes audio data from the DVD data received from the DVD controller (DVD-CONT) 362 via the DVD data dedicated signal path 388, and outputs audio signals. The video decoder 366, the sub-picture decoder 368, and the audio decoder 370 are configured to be capable of decoding video content encoded according to a plurality of video encoding standards at a variety of encoding rates, so that it can decode video content downloaded from the video server 102a encoded according to various video encoding standards and video encoding rates selected by the video server 102a.

The video mixer (MIX) 372 mixes the video data decoded by the video decoder (VIDEO-DEC) 366 and the sub-picture data decoded by the sub-picture decoder (SUB-PICTURE-DEC) 368 to generate an output video for display. The audio amplifier (AMP) 374 amplifies the audio signal decoded by the audio decoder (AUDIO-DEC) 370. The display (DISP) 370 displays the output video generated by the video mixer (MIX) 372. The display 376 can be a cathode-ray tube (CRT) used in conventional TV receivers, a liquid crystal display, a plasma display panel, or any other type of display device. The speaker 380 produces sound corresponding to the audio signal amplified by the audio amplifier (AMP) 374.

The DVD player 104n may also be used so as to provide video and audio to an external display (not shown) and an external speaker (not shown). In this case, the display 376 and the speaker 380 in the DVD player 104n are optional components. The composite converter (COMPOS-CONV) 378 converts the output video data generated by the video mixer (MIX) 372 into an analog format compatible with conventional displays. The technical details of the composite converter (COMPOS-CONV) 378 are well known in the art.

The DVD player 104n may be different from conventional DVD players in that it receives video content downloaded from the video server 102a via the communications interface 390 and stores it in the storage unit 392 for immediate or future retrieval. As previously described, however, it is not necessary that the DVD player 104n store the downloaded video content. Rather, the DVD player 104n might play the video content in real-time or near real-time as it is downloaded to the DVD player 104n but not otherwise store the video content for future playback. The communications interface 390 can be any type of wireless or wired communications interface as illustrated above, and is controlled by the controller 354. The storage unit 392 is coupled to the communications interface 390 and the video decoder 366 and outputs the stored television signal to the video decoder 366 for decoding. The storage unit 392 can be a DRAM, SRAM, flash memory, or any other type of memory device that can store digital video data. The video decoder 366 also has selection logic (not shown) that enables the video decoder 366 to select either the DVD video data received from the decrypter 364 or the video content stored in the storage unit 392 in response to a control signal from the controller 354.

The video encoding standard and the video encoding rate according to which the video content is encoded for downloading to the DVD player 104n are selected by the video server 102a based upon various factors as described above, including the data transmission rate of the communication channel between the video server 102a and the DVD player 104n, the processing power of the DVD player 104n, and the type of video content to be downloaded. Therefore, the video server 102a can download video content to the DVD player 104n at an optimum data transmission rate.

Figure 4:
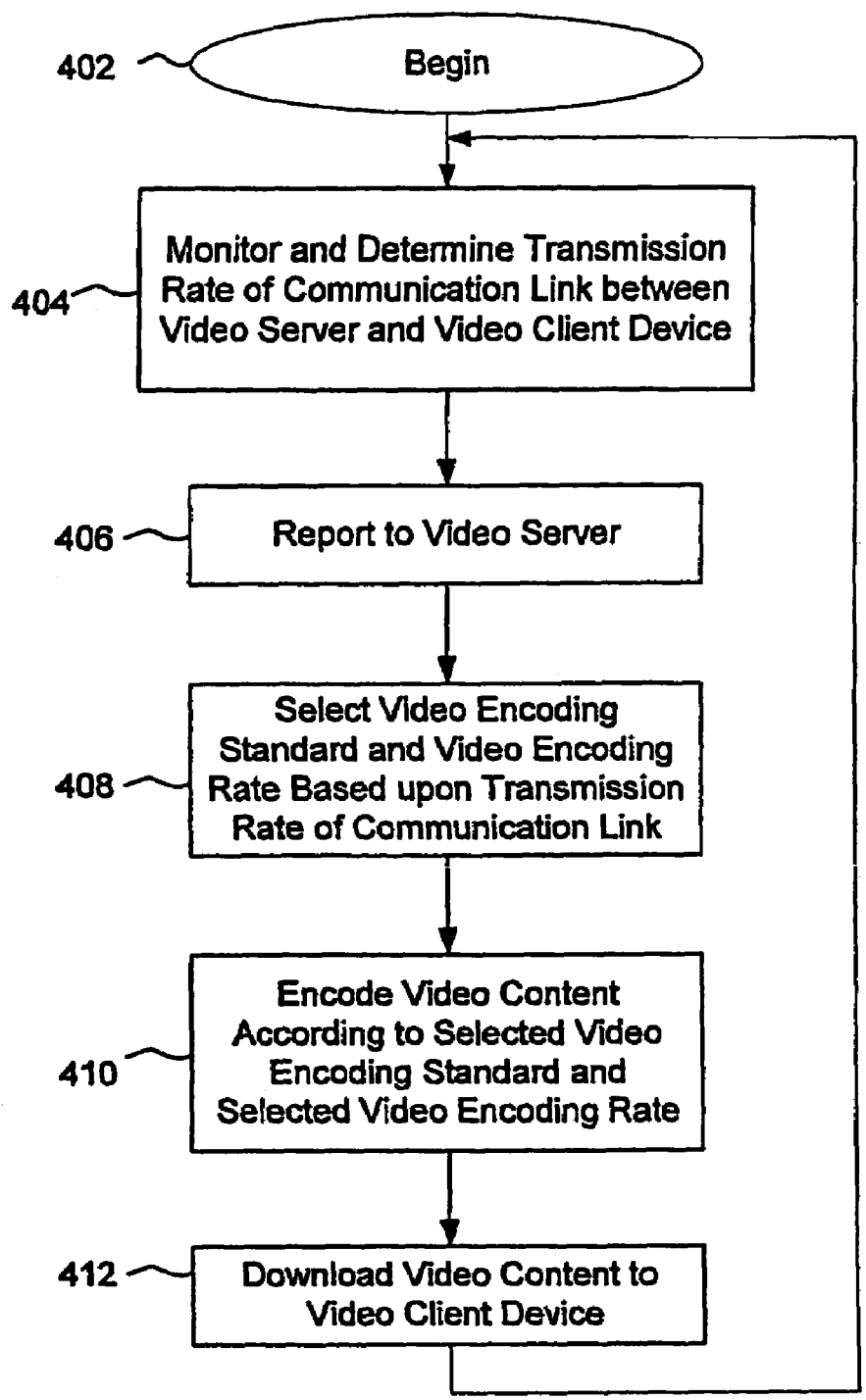
FIG. 4 is a flowchart illustrating a method of selecting a video encoding standard and a video encoding rate according to a first embodiment of the present invention.

FIG. 4 is a flowchart illustrating a method of selecting a video encoding standard and a video encoding rate according to a first embodiment of the present invention. This method is carried out by a controller of the video server 102a, for example by the controller 208 of the digital video recorder 102a of FIG. 2, to select a video encoding standard and a video encoding rate based upon the data transmission rate of the communication network between the video server 102a and the video client devices 104a, 104n. The method of FIG. 4 will be explained in conjunction with FIG. 1.

Referring to FIGS. 1 and 4, as the process begins 402, the video server 102a monitors and determines 404 the data transmission protocol and rate of the communication network between the video server 102a and the video client devices 104a, 104n. For example, the video server 102a determines the transmission rate the communication network can handle, preferably in terms of bits per second. This information is reported 406 to the video server 102a. The video server 102a selects 408 a video encoding standard and a video encoding rate based upon the determined data transmission rate of the communication network. For example, the video server 102a might use the best quality encoding standard and highest encoding rate supported by the data transmission rate of the communication network. It is not necessary, however, that the video server 102a select the best quality encoding standard and highest encoding rate supported by the communication channel and/or video client device.

Once the video encoding standard and the video encoding rate are selected, the video server 102a transcodes 410 the video content stored therein according to the selected video encoding standard and the selected video encoding rate. Finally, the transcoded video content is downloaded 412 to the video client devices 104a, 104n. Then, the process returns to step 404 to keep monitoring the transmission rate of the communication link between the vide server and the video client device, so that the video encoding standard and rate can be adaptively selected based upon any changes.

Figure 5:
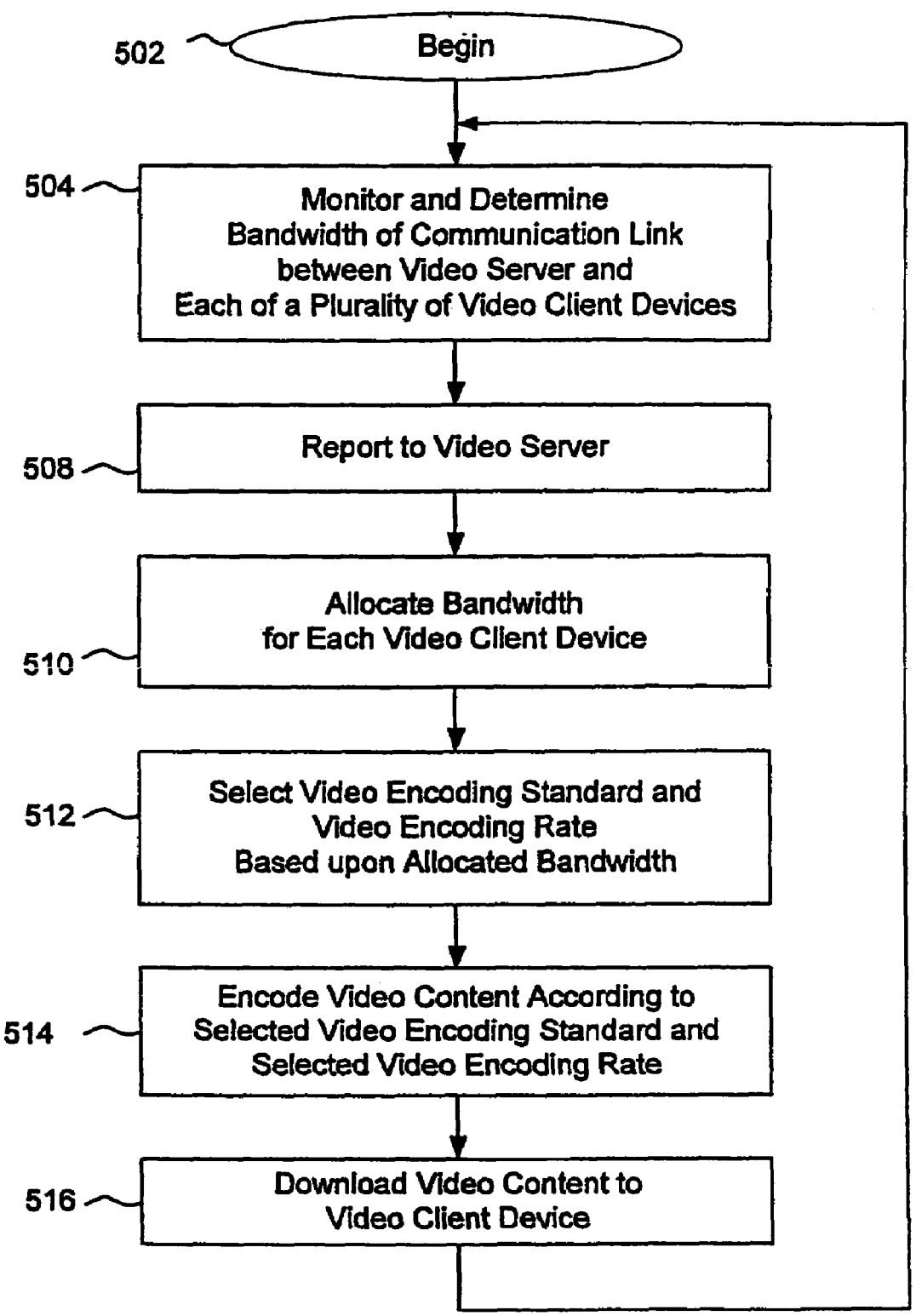
FIG. 5 is a flowchart illustrating a method of selecting a video encoding standard and a video encoding rate according to a second embodiment of the present invention.

FIG. 5 is a flowchart illustrating a method of selecting a video encoding standard and a video encoding rate according to a second embodiment of the present invention. This method is carried out by a controller of the video server 102a, for example, the controller 208 of the digital video recorder 102a of FIG. 2, to allocate an appropriate bandwidth among a plurality of video client devices 104a, 104n coupled to a video network. The method further selects a video encoding standard and a video encoding rate based upon the allocated bandwidth. The method of FIG. 5 will be explained in conjunction with FIG. 1.

Referring to FIGS. 1 and 5, as the process begins 502 the video server 102a monitors and determines 504 the bandwidth of the communication network between the video server 102a and the plurality of video client devices 104a, 104n. For example, the video server 102a determines the transmission rate supported by the communication network. This information is then reported 508 to the video server 102a.

Then, the video server 102a allocates 510 an appropriate bandwidth for each video client device 104a, 104n connected to the video network based upon the determined bandwidth of the communication network and also selects 512 an appropriate video encoding standard and video encoding rate based upon the allocated bandwidth. For example, the video server 102a might allocate bandwidth equally among the video client devices 104a, 104n. In another example, the video server 102a might use an unequal allocation of bandwidth among the client devices 104a, 104n. Once the video server 102a allocates the bandwidth, it may then select the best video encoding standard and highest encoding rate supported by the respective bandwidth allocations. It is not necessary, however, that the video server 102a select the best video encoding standard and highest encoding rate supported by the communication network and the client devices. Other selections might be made, and other factors might affect the selection.

Once the video encoding standard and the video encoding rate are selected, the video server 102a transcodes 514 video content stored therein according to the selected video encoding standard and the video encoding rate. Finally, the transcoded video content is downloaded 516 to the video client devices 104a, 104n. Then, the process returns to step 504 to keep monitoring the bandwidth of the communication link between the video server and the video client device, so that the video encoding standard and rate can be adaptively selected based upon constant monitoring and allocation of the bandwidth of the communication link. Since the video content is transcoded according to a video encoding standard and a video encoding rate compatible with the bandwidth allocated to a plurality of video client devices coupled to a video network, video content can be simultaneously downloaded to the plurality of video client devices.

Figure 6:
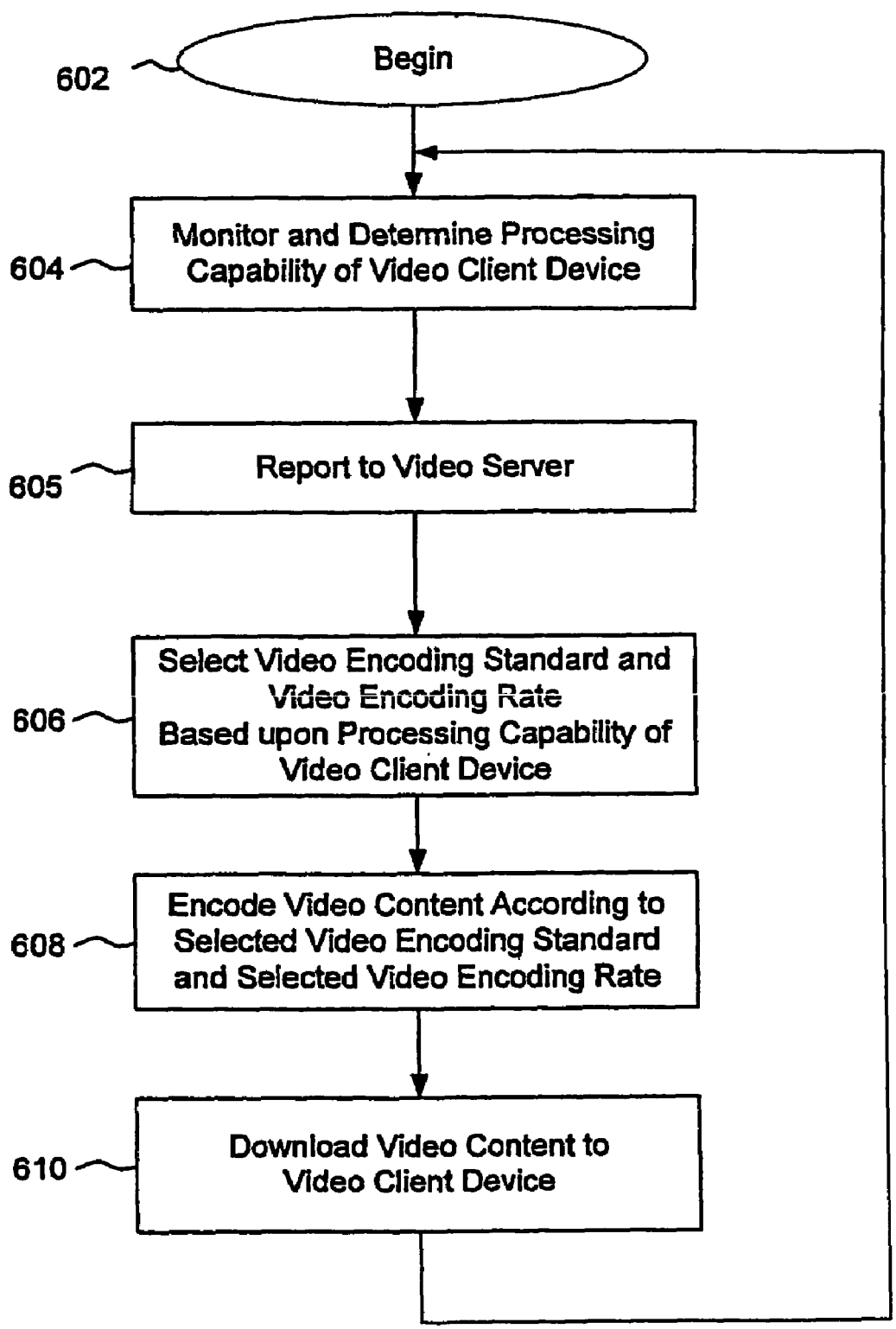
FIG. 6 is a flowchart illustrating a method of selecting a video encoding standard and a video encoding rate according to a third embodiment of the present invention.

FIG. 6 is a flowchart illustrating a method of selecting a video encoding standard and video encoding rate according to a third embodiment of the present invention. This method is carried out by the video server 102a, for example, by the controller 208 of the digital video recorder 102a in FIG. 2 to select an appropriate video encoding standard and video encoding rate based upon the processing capability of the video client devices 104a, 104n coupled to the video network. The method of FIG. 6 will be explained in conjunction with FIG. 1.

Referring to FIGS. 1 and 6, as the process begins 602, the video server 102a monitors and determines 604 the processing capabilities, including the processing speed and the buffer size, of the video client devices 104a, 104n coupled to a video network. For example, the video server 102a determines the encoding rate that the video client devices 104a, 104n can handle and decode using its processor, for example the controller 306 of FIG. 3A or the CPU 354 of FIG. 3B. This information is then reported 605 to the video server 102a. The manner in which the processing capability of the video client device is determined is well known in the art.

Then, the video server 102a adaptively selects 606 a video encoding standard and a video encoding rate compatible with the processing capability of the video client devices 104a, 104n. For example, if the video client devices 104a, 104n do not have the processing speed to decode video content encoded at encoding rates higher than 2 Mbps, the video server 102a might selects the MPEG-1 standard since it does not require an encoding rate higher than 2 Mbps. Accordingly, a video encoding rate consistent with MPEG-1, such as 1.25 Mbps, might be selected as the encoding rate. On the other hand, if the video client devices 104a, 104n have processing speed to decode video content encoded at encoding rates of up to 16 Mbps, the video server 102a might select MPEG-2 that uses rates of 4-16 Mbps.

Once the video encoding standard and the video encoding rate are selected, the video server 102a transcodes 608 video content stored therein according to the selected video encoding standard and the video client devices 104a, 104n. Then, the process returns to step 604 to keep monitoring the processing capability of the video client devices, so that the video encoding standard and rate can be adaptively selected based upon constant monitoring of such processing capabilities. Since the video content is adaptively transcoded according to a video encoding standard and a video encoding rate compatible with the processing capabilities of the video client device coupled to the video network, video content can be downloaded to the video client device in a format that is compatible with the video client device but still effectively utilizes the client device's available resources.

Figure 7:
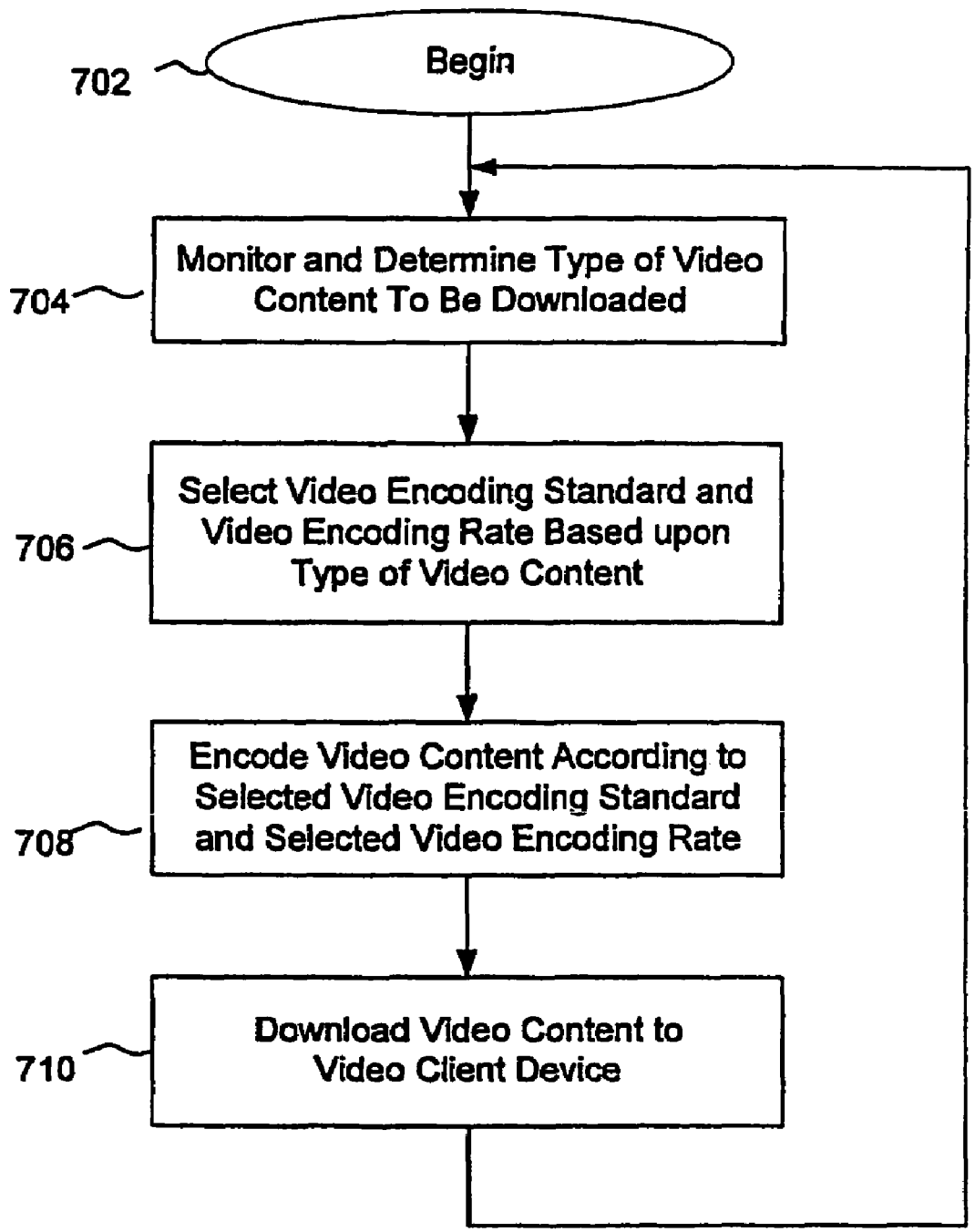
FIG. 7 is a flowchart illustrating a method of selecting a video encoding standard and a video encoding rate according to a fourth embodiment of the present invention.

FIG. 7 is a flowchart illustrating a method of selecting a video encoding standard and a video encoding rate according to a fourth embodiment of the present invention. This method is carried out by the video server 102a, for example the controller 208 of the digital video recorder 102a of FIG. 2, to select an appropriate video encoding standard and video encoding rate based upon the type of video content to be downloaded to the video client devices 104a, 104n. The method of FIG. 7 will be explained in conjunction with FIG. 1.

Referring to FIGS. 1 and 7, as the process begins 702, the video server 102a monitors and determines 704 the type of video content to be downloaded to the video client devices 104a, 104n coupled to the video network.

Then, the video server 102a selects 706 a video encoding standard and a video encoding rate appropriate for the type of the video content. For example, if the type of video content to be downloaded to the video client devices 104a, 104n requires high-quality images such as animation, the video server 102a selects a video encoding standard and a video encoding rate that delivers higher quality images compatible with the type of such video content. On the other hand, if the type of video content does not require high-quality images, such as recordings of concerts, the video server 102a selects a lower quality video encoding standard and video encoding rate that can deliver acceptable quality images. In this manner, the digital video recorder 102a can save bandwidth when dealing with a plurality of video client devices 104a, 104n.

Once the video encoding standard and the video encoding rate are selected, the video server 102a transcodes 708 video content stored therein according to the selected video encoding standard and the video encoding rate. Finally, the transcoded video content is downloaded 710 to the video client devices 104a, 104n. Then, the process returns to step 704 to keep monitoring the type of video content, so that the video encoding standard and rate can be adaptively selected based upon constant monitoring of the type of the video content. Since the video content is adaptively transcoded according to a video encoding standard and a video encoding rate compatible with the type of video content to be downloaded, the video content can be downloaded to the video client devices in a format that maintains the quality of the video content while still saving bandwidth in the transmission over the video network.

Although the present invention has been described above with respect to several embodiments, various modifications can be made within the scope of the present invention. For example, the method described in FIGS. 4-7 can be used independently within the video server or two or more of the methods can be combined to result in a more efficient method of downloading video content to video client devices coupled to a video network. More specifically, a method could consider both the video content being transmitted and the communication channel bandwidth in selecting a video encoding standard. In addition, the methods described in FIGS. 4-7 can be used with both wireless and wired communication networks. The present invention can be used with video networks using any type of wireless communication standards or with any wired communications standards. The present invention can also be used with any type of digital video encoding standard. The video client devices can have more intelligence than described above, such that the entire methods of FIGS. 4-7 or at least part of the methods can be carried out in the video client devices rather than in the video server. In addition, the video server and the video client device are not limited to those described in FIGS. 2, 3A, and 3B, but can be any type of digital video device that has similar capabilities. Accordingly, the disclosure of the present invention is intended to be illustrative, but not limiting, of the scope of the invention, which is set forth in the following claims.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. While various elements of the preferred embodiments have been described as being implemented in software, in other embodiments hardware or firmware implementations may alternatively be used, and vice-versa.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more, fewer or other elements may be used in the block diagrams. The claims should not be read as limited to the described order or elements unless stated to that effect.

In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. An apparatus for downloading video content to a client device over a communication network, the apparatus comprising:
    an encoder for encoding video content according to an initial video encoding standard and an initial video encoding rate;
    a storage unit coupled to the encoder for storing the encoded video content;
    a transcoder coupled to the storage unit for transcoding the video content stored in the storage unit according to a modified video encoding standard and a modified video encoding rate;
    a communications interface coupled to the transcoder for downloading the video content to the client device over the communication network; and
    a controller coupled to and controlling the storage unit, the encoder, the transcoder, and the communications interface, the controller monitoring and determining a transmission rate of the communication network and a number of a plurality of other client devices and adaptively selecting the modified video encoding standard and the modified video encoding rate based on the determined transmission rate and the number of the plurality of other client devices.

2. The apparatus of claim 1, wherein the transcoder converts the video content from the initial video encoding standard directly to the modified video encoding standard without decoding the video content.

3. The apparatus of claim 1, wherein the transcoder decodes the video content from the initial video encoding standard and re-encodes the video content to the modified video encoding standard.

4. The apparatus of claim 1, further comprising a transrater for altering the modified transmission rate of the video content, based on a change in the transmission rate of the communication network, during a download of the video content to the client device.

5. The apparatus of claim 1, wherein the modified video encoding standard is MPEG-1, MPEG-2 or MPEG-4.

6. The apparatus of claim 1, wherein the communication network is a wireless communication network.

7. An apparatus for downloading video content to a plurality of client devices over a communication network having a bandwidth, the apparatus comprising:
    an encoder for encoding video content according to an initial video encoding standard and an initial video encoding rate;
    a storage unit coupled to the encoder for storing the encoded video content;
    a transcoder coupled to the storage unit for transcoding the video content stored in the storage unit according to a set of modified video encoding standards and a set of modified video encoding rates;
    a communications interface coupled to the transcoder for downloading the video content to the client devices over the communication network; and
    a controller coupled to and controlling the storage unit, the encoder, the transcoder, and the communications interface, the controller monitoring and determining the bandwidth of the communication network and a number of the client devices and allocating at least part of the bandwidth to each of the client devices, the controller adaptively selecting the set of modified video encoding standards and the set of modified video encoding rates based on the allocated bandwidth for each client device and the number of the client devices.

8. The apparatus of claim 7, wherein the transcoder converts the video content from the initial video encoding standard directly to the modified video encoding standard without decoding the video content.

9. The apparatus of claim 7, wherein the transcoder decodes the video content from the initial video encoding standard and re-encodes the video content to the modified video encoding standard.

10. The apparatus of claim 7, further comprising a transrater for transrating the video content to a different transmission rate than the modified transmission rate, based on a change on the transmission rate of the communication network, during a download of the video content to one of the client devices.

11. An apparatus for downloading video content to a client device over a communication network, the apparatus comprising:
    an encoder for encoding video content according to an initial video encoding standard and an initial video encoding rate;
    a storage unit coupled to the encoder for storing the encoded video content;

a transcoder coupled to the storage unit for transcoding the video content stored in the storage unit according to a modified video encoding standard and a modified video encoding rate;

a communications interface coupled to the transcoder for downloading the video content to the client device over the communication network; and a controller coupled to and controlling the storage unit, the encoder, the transcoder, and the communications interface, the controller monitoring and determining a processing speed of the client device and a number of a plurality of other client devices and adaptively selecting the modified video encoding standard and the modified video encoding rate based on the processing speed and the number of the plurality of other client devices.

12. The apparatus of claim 11, wherein the transcoder converts the video content from the initial video encoding standard directly to the modified video encoding standard without decoding the video content.

13. The apparatus of claim 11, wherein the transcoder decodes the video content from the initial video encoding standard and re-encodes the video content to the modified video encoding standard.

14. The apparatus of claim 11, further comprising a transrater for transrating the video content to a different transmission rate than the modified transmission rate, based on a change in a transmission rate of the communication network, during a download of the video content to the client device.

15. The apparatus of claim 11, wherein the modified video encoding standard is MPEG-1, MPEG-2 or MPEG-4.

16. An apparatus for downloading video content to a client device over a communication network, the apparatus comprising:

an encoder for encoding video content according to an initial video encoding standard and an initial video encoding rate;

a storage unit coupled to the encoder for storing the encoded video content;

a transcoder coupled to the storage unit for transcoding the video content stored in the storage unit according to a modified video encoding standard and a modified video encoding rate;

a communications interface coupled to the transcoder for downloading the video content to the client device over the communication network; and a controller coupled to and controlling the storage unit, the encoder, the transcoder, and the communications interface, the controller monitoring and determining a type of the video content to be downloaded and a number of a plurality of other client devices and adaptively selecting the modified video encoding standard and the modified video encoding rate based on the type of the video content and the number of the plurality of other devices.

17. The apparatus of claim 16, wherein the transcoder converts the video content from the initial video encoding standard directly to the modified video encoding standard without decoding the video content.

18. The apparatus of claim 16, wherein the transcoder decodes the video content from the initial video encoding standard and re-encodes the video content to the modified video encoding standard.

19. The apparatus of claim 16, further comprising a transrater for transrating the video content to a different transmission rate than the modified transmission rate, based on a change in a transmission rate of the communication network, during a download of the video content to the client device.

20. The apparatus of claim 16, wherein the modified video encoding standard is MPEG-1, MPEG-2 or MPEG-4.

21. In a video server downloading video content to a video client device over a communication network, a method of downloading the video content from the video server to the video client device, the method comprising:

determining a transmission rate of the communication network and a number of a plurality of other video client devices;

adaptively selecting a video encoding standard and a video encoding rate based on the determined transmission rate of the communication network and the number of a plurality of other video client devices;

transcoding the video content from an initial video encoding standard and an initial video encoding rate to the selected video encoding standard and the selected video encoding rate; and downloading the transcoded video content to the video client device over the communication network.

22. The method of claim 21, further comprising:

during the download of the transcoded video content to the video client device, detecting a change in the determined transmission rate of the communication network;

transrating a remaining portion of the video content that has not already been downloaded to the video client device; and downloading the transrated remaining portion of the video content to the video client device.

23. The method of claim 21, wherein transcoding the video content comprises converting the video content from the initial video encoding standard and the initial video encoding rate directly to the selected video encoding standard and the selected video encoding rate without decoding the video content.

24. The method of claim 21, wherein the selected video encoding standard is MPEG-1, MPEG-2 or MPEG-4.

25. In a video server downloading video content to a plurality of video client devices over a communication network having a bandwidth, a method of downloading the video content from the video server to the video client devices, the method comprising:

determining an available bandwidth of the communication network and a number of the video client devices;

allocating at least part of the available bandwidth to a first video client device and a second video client device;

adaptively selecting respective video encoding standards and video encoding rates for the first and second video client devices based on the available bandwidth allocated to the first and second client devices and a number of the video client devices;

transcoding the video content from an initial video encoding standard and an initial video encoding rate to the respective selected video encoding standards and selected video encoding rates; and downloading the transcoded video content to first and second client devices over the communication network.

26. The method of claim 25, further comprising:

during the download of the transcoded video content to the first video client device, detecting a change in the available bandwidth of the communication network;

based on the change in the available bandwidth, transrating a remaining portion of the video content that has not already been downloaded to the first video client device; and downloading the transrated remaining portion of the video content to the first video client device.

27. The method of claim 25, further comprising:
during the download of the transcoded video content to the first video client device, detecting a change in the available bandwidth of the communication network;
reallocating at least part of the available bandwidth among the first and second video client devices;
based on the reallocated available bandwidth, transrating respective portions of the video content that have not already been downloaded to the first and second video client devices; and
downloading the respective transrated portions of the video content to the first and second video client devices.

28. The apparatus of claim 25, wherein transcoding the video content comprises converting the video content from the initial video encoding standard and the initial video encoding rate directly to the selected video encoding standards and video encoding rates without decoding the video content.

29. The method of claim 25, wherein at least one of the selected video encoding standards is MPEG-1, MPEG-2 or MPEG-4.

30. In a video server downloading video content to a video client device over a communication network, a method of downloading the video content from the video server to the video client device, the method comprising:
determining a processing capability of the video client device and a number of a plurality of other video client devices;
selecting a video encoding standard and a video encoding rate based on the determined processing capability and the number of a plurality of other video client devices;
transcoding the video content from an initial video encoding standard and an initial video encoding rate to the selected video encoding standard and the selected video encoding rate; and
downloading the transcoded video content to the video client device over the communication network.

31. The method of claim 30, further comprising:
determining a current data transmission rate of the communication network; and
wherein selecting the video encoding standard and the video encoding rate comprises selecting the video encoding standard and the video encoding rate based on the determined processing capability of the video client device and the current data transmission rate of the communication network.

32. The method of claim 31, further comprising:
during the download of the video content to the video client device, detecting a change in the current data transmission rate of the communication network;
transrating a remaining portion of the video content that has not already been downloaded to the video client device; and
downloading the transrated remaining portion of the video content to the client device.

33. The apparatus of claim 30, wherein transcoding the video content comprises converting the video content from the initial video encoding standard and the initial video encoding rate directly to the selected video encoding standard and the selected video encoding rate without decoding the video content.

34. The method of claim 30, wherein the selected video encoding standard is MPEG-1, MPEG-2 or MPEG-4.

35. In a video server downloading video content to a video client device over a communication network, a method of downloading the video content from the video server to the video client device, the method comprising:
determining a type of the video content to be downloaded and a number of a plurality of other video client devices;
selecting a video encoding standard and a video encoding rate based on the determined type of the video content and the number of a plurality of other video client devices;
transcoding the video content form an initial video encoding standard and an initial video encoding rate to the selected video encoding standard and the selected video encoding rate; and
downloading the transcoded video content to the video client device over the communication network.

36. The method of claim 35, further comprising:
determining a current data transmission rate of the communication network; and
wherein selecting the video encoding standard and the video encoding rate comprises selecting the video encoding standard and the video encoding rate based on the determined type of the video content and the current data transmission rate of the communication network.

37. The method of claim 36, further comprising:
during the download of the video content to the video client device, detecting a change in the current data transmission rate of the communication network;
transrating a remaining portion of the video content that has not already been downloaded to the video client device; and
downloading the transrated remaining portion of the video content to the client device.

38. The apparatus of claim 35, wherein transcoding the video content comprises converting the video content from the initial video encoding standard and the initial video encoding rate directly to the selected video encoding standard and the selected video encoding rate without decoding the video content.

39. The method of claim 35, wherein the selected video encoding standard is MPEG-1, MPEG-2 or MPEG-4.

* * * * *